Figure 1:
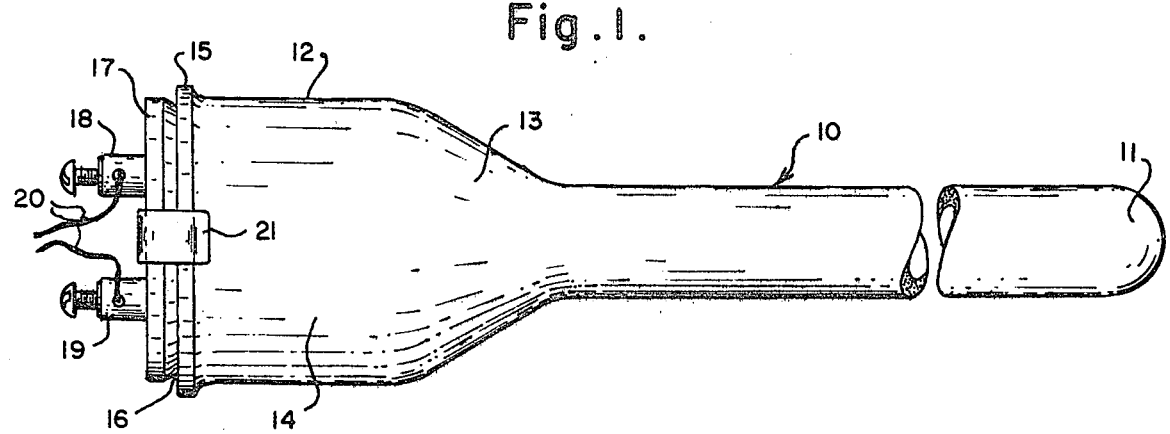

United States Patent [19]
Blaze, Jr.

[11] 4,088,509
[45] May 9, 1978

[54] THERMOCOUPLE PROTECTION TUBES
[75] Inventor: Joseph E. Blaze, Jr., Beaver Falls, Pa.
[73] Assignee: McDanel Refractory Porcelain Company, Beaver Falls, Pa.
[21] Appl. No.: 774,258
[22] Filed: Mar. 4, 1977
[51] Int. Cl.² .................................... H01L 35/06
[52] U.S. Cl. .............................. 136/235; 136/230
[58] Field of Search ............................ 136/230, 235
[56] References Cited
U.S. PATENT DOCUMENTS
3,725,134  4/1973  Gessner et al. ................. 136/235

Primary Examiner—Leland A. Sebastian
Attorney, Agent, or Firm—Buell, Blenko & Ziesenheim

[57] ABSTRACT

An all ceramic thermocouple protector tube is provided having a tubular elongate ceramic thermocouple protector closed at one end and open at the other to receive a thermocouple, an adjacent larger diameter cylindrical ceramic housing spaced from said tubular elongate thermocouple protector and connected thereto by a hollow frusto conical ceramic member having a taper in the range 20° to 60° and an annular pocket in the end of said housing remote from the frusto conical portion adapted to receive a cover.

6 Claims, 2 Drawing Figures

U.S. Patent

May 9, 1978

4,088,509

THERMOCOUPLE PROTECTION TUBES

This invention relates to thermocouple protection tubes and particularly to an all ceramic thermocouple protection tube including the terminal head portion.

The use of thermocouples as a means for measuring temperature is well known. It is equally well known to use a ceramic protection tube around the thermocouple to protect it from the presence of hostile gas environments as well as from physical damage. Historically, these thermocouple protective covers have been made in a combination of ceramic and metal parts. Usually the combination consisted of an elongate cylindrical ceramic tube which projected through an opening in the furnace wall into the interior of the furnace where material temperature was to be measured. Generally such tubes were made of high purity-gas tight refractory oxide such as alumina, mullite or porcelain designed to protect the thermocouple from mechanical damage, electrical shorting and hostile gas environments.

In order, however, to make the necessary electrical connection from the thermocouple to the reading instrument (usually located some considerable distance from the thermocouple) it was necessary to attach to the open end of the ceramic tube an enlarged metal head. This enlarged metal head not only acted as the housing for the connection between the thermocouple wires and the leads to the recording instrument, but also acted as a heat shield for the leads and coupling devices between the leads and thermocouple wires. In the past this was usually done by attaching a metal tube threaded at one end by cementing onto the end of the ceramic protective tube and then threading a cup shaped metal container onto the threaded end of the metal tube. Finally, a metal cap was fitted into the open end of the cup shaped housing. This cap was provided with the connecting terminals which had to be insulated from the cap, usually with mica or similar refractory sheets.

There has long been a need for a thermocouple protective tube which was completely made of ceramic, particularly where temperatures above 1800° F. are involved. Such a tube would have many obvious advantages. It would give better protection from corrosive atmospheres. It would be less susceptible to damage from open flame and would eliminate thermocouple failures due to oxidation or melting of the metal parts.

Unfortunately, it is difficult to cast an all ceramic protective tube having both the small diameter tube for insertion into the furnace and the large diameter head or housing for making the lead connection to the reading instruments and yet having sufficient unfired strength to be processed without having an angle so small as to be unacceptable in use.

The present invention provides such an all ceramic protective tube for thermocouples based upon a new shape involving certain critical angles between parts of varying diameters.

The present invention provides an all ceramic thermocouple protector comprising a small diameter elongate tubular ceramic portion closed at one end and open at the other adapted to receive the thermocouple for insertion in a furnace, an adjacent larger diameter cylindrical ceramic housing spaced from said small diameter tubular portion and connected thereto by a frusto conical ceramic portion having a taper in the range 20° to 60° and preferably about 30°–45°, a frusto conical outer lip on said adjacent larger diameter housing forming an outer pocket, a circular ceramic cover fitting in said pocket, said cover having formed therein a pre-selected number of leads for connecting thermocouple wires to external lead wires and spring latch means fixed to said cover resiliently engage over the edge of the frusto conical outer lip to urge the cover in sealing engagement in the outer pocket. This outer frusto conical lip, in addition to forming a pocket for the cover, acts to enlarge the diameter of the tube head to provide additional radiation protection to the lead wires. Preferably the tube of this invention is cast of mullite, alumina or porcelain, removed from the mold and fired in usual diameter. Preferably the outer pocket is cast but it may be machined in the green as cast tube. Preferably the holding spring is made of stainless steel but could be made of any metal which will withstand the temperature encountered by radiation at the outside edge of the lip.

Figure 2:
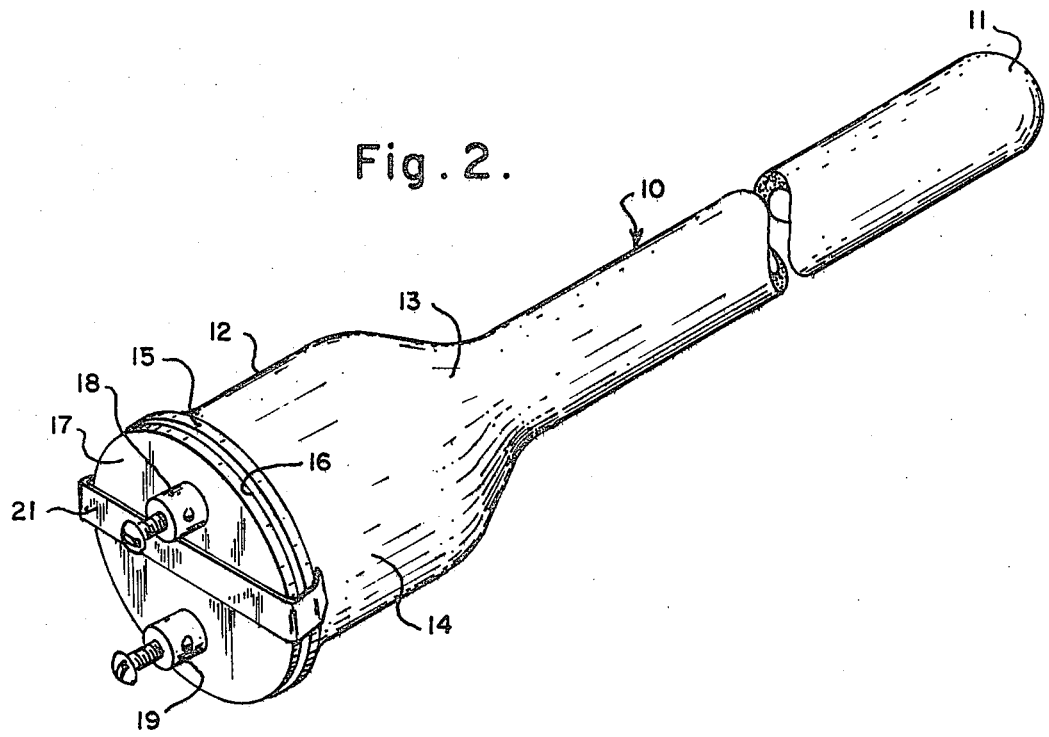

In the foregoing general description certain objects, purposes and advantages of this invention have been set out. Other objects, purposes and advantages of this invention will be apparent from a consideration of the following description and the accompanying drawings in which:

FIG. 1 is a side elevational view of a thermocouple protective tube according to this invention, and FIG. 2 is an isometric end view, viewed from the left of FIG. 1, showing the cover in place.

Referring to the drawings there is illustrated a small diameter elongate tubular ceramic thermocouple protector 10 closed at one end 11 and connected at the other end 12 by means of a 30° frusto conical ceramic portion 13 to a relatively large diameter ceramic housing 14 having at its outer end a frusto conical outwardly projecting lip 15 having a pocket 16 at the end of housing 14. A conventional circular metal cover or a ceramic cover 17 carrying lead posts 18 and 19 for connecting the thermocouple wires inside the housing to external leads 20 going to a recording device. A spring clip fastener 21 may be fixed on cap or cover 17 to clip over the edges of the frusto conical lip 15 to urge the cover 17 in tight sealing relationship with the housing.

In the foregoing specification certain preferred embodiments and practices of this invention have been set out, however, it will be understood that this invention may be otherwise embodied within the scope of the following claims.

I claim:

1. An all ceramic thermocouple protector comprising a tubular elongate ceramic thermocouple protector closed at one end and open at the other to receive a thermocouple, an adjacent larger diameter cylindrical ceramic housing spaced from said tubular elongate thermocouple protector and connected thereto by a hollow frusto conical ceramic member having a taper in the range 20° to 60° and an annular pocket in the end of said housing remote from the frusto conical portion adapted to receive a cover.

2. An all ceramic thermocouple protector as claimed in claim 1 wherein the frusto conical portion has a 30°–45° taper.

3. An all ceramic thermocouple protector as claimed in claim 1 wherein the inner annular pocket is formed by a second frusto conical portion extending radially outwardly from the end of the housing remote from the frusto conical connector portion.

4. An all ceramic thermocouple protector as claimed in claim 1 having a circular ceramic cover fitting within the annular pocket and carrying lead posts for connecting thermocouple wires to lead wires for a recording instrument.

5. An all ceramic thermocouple protector as claimed in claim 3 having a circular ceramic cover fitting with the second frusto conical portion and carrying lead posts for connecting thermocouple wires to lead wires for a recording instrument.

6. An all ceramic thermocouple protector as claimed in claim 5 wherein spring means engaged over the edges of the second frusto conical portion urge the cover into sealing engagement with the inner pocket.

* * * * *